United States Patent
Lee (10) Patent No.: US 7,859,788 B2
(45) Date of Patent: Dec. 28, 2010

(54) HARD DISK DRIVE (HDD), METHOD IMPROVING READ HIT RATION IN HDD, AND MEDIUM RECORDING COMPUTER PROGRAM PERFORMING METHOD

(75) Inventor: Ju-Young Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 818 days.

(21) Appl. No.: 11/766,226

(22) Filed: Jun. 21, 2007

(65) Prior Publication Data

US 2008/0002282 A1 Jan. 3, 2008

(30) Foreign Application Priority Data

Jul. 3, 2006 (KR) .................... 10-2006-0062206

(51) Int. Cl.
G11B 5/596 (2006.01)
G11B 21/02 (2006.01)

(52) U.S. Cl. .............. 360/78.04; 360/75; 711/112; 711/167

(58) Field of Classification Search ............ None
See application file for complete search history.

(56) References Cited

U.S. PATENT DOCUMENTS

| 6,209,058 | B1 * | 3/2001 | Shats et al. ............ 711/113 |
| 6,604,178 | B1 | 8/2003 | Hall |
| 6,658,535 | B1 * | 12/2003 | Megiddo et al. ........ 711/137 |
| 6,848,019 | B1 | 1/2005 | Mobley et al. |
| 2007/0276993 | A1 * | 11/2007 | Hiratsuka ............ 711/112 |

FOREIGN PATENT DOCUMENTS

| JP | 07-312046 | 11/1995 |
| JP | 2001-006304 | 1/2001 |
| KR | 10-1993-0010925 | 6/1993 |

* cited by examiner

Primary Examiner—Andrew L Sniezek
(74) Attorney, Agent, or Firm—Volentine & Whitt, PLLC (57) ABSTRACT

In a method of improving read hits to pre-fetch data stored in a memory associated with a hard disk drive (HDD). The method includes; receiving a read command indicating a target sector on a disk in the HDD, obtaining a latency time in relation to a movement time and a search time, and during the latency time, reading pre-fetch data from the disk at a current position of a magnetic head and storing the pre-fetch data in the memory before executing the received read command.

14 Claims, 10 Drawing Sheets

FIG. 8

HARD DISK DRIVE (HDD), METHOD IMPROVING READ HIT RATION IN HDD, AND MEDIUM RECORDING COMPUTER PROGRAM PERFORMING METHOD

BACKGROUND OF THE INVENTION

1. Field of the Invention

The present invention relates to a hard disk drives (HDDs). More particularly, the invention relates to a HDD using a method that improves a read hit ratio to data stored in a memory associated with the HDD.

This application claims priority to Korean Patent Application No. 10-2006-62206, filed on Jul. 3, 2006, the subject matter of which is hereby incorporated by reference.

2. Description of Related Art

Conventional HDDs are data storage devices adapted to record (write) data on and reproduce (read) data from magnetic recording medium generally referred to as a disk. HDDs are widely used as auxiliary data storage devices in computer systems because of the fast access time they provide to large quantities of stored data. During write operations, HDDs convert digital electric pulses into a fluctuating magnetic field in order to write data on the disk. During read operations, an induced magnetic field from the disk is converted into digital electric pulses. During both read and write operations, one or more magnetic head(s) moves across a disk surface to a target sector where data has been (or will be) written. The time required to move the magnetic head and/or the portion of the disk surface containing the target sector represents a significant portion of the overall delay required to read data from the disk. Minimizing this delay is an important HDD design consideration.

Recognizing the importance of minimizing the data access delay, it should be noted that there are often times where the magnetic head is properly positioned over a target track on the disk, but the disk requires some period of time to rotate the target sector under the magnetic head. This rotational movement time is part and parcel of the overall access delay and should be accounted for in any attempt to maximize the efficiency of read/write within the HDD.

SUMMARY OF THE INVENTION

Embodiments of the invention provide a HDD having an improved read hit ratio to data stored in a memory associated with the HDD, as compared with conventional HDDs. Embodiments of the invention also provide a method of improving the read hit ratio. Such methods may be implemented on computer readable recording medium.

In one embodiment, the invention provides a method for increasing read hits to pre-fetch data stored in a memory associated with a hard disk drive (HDD), the method comprising; receiving a read command indicating a target sector on a disk in the HDD, obtaining a latency time ($T_L$) in relation to a movement time ($T_M$) and a search time ($T_S$), wherein the movement time ($T_M$) is defined as the time required to rotate the disk, such that the target sector moves from an initial position ($P_0$) to a target position ($P_1$), and the search time ($T_S$) is defined as the time required to move a magnetic head in the HDD from a current position ($P_C$) to the target position ($P_1$) and during the latency time ($T_L$), reading pre-fetch data from the disk at the current position ($P_C$) and storing the pre-fetch data in the memory before executing the received read command.

In another embodiment, the invention provides a computer readable recording medium for recording a computer program performing said method.

In another embodiment, the invention provides a hard disk drive (HDD) comprising; a disk, a magnetic head reading data from the disk, a memory configured to store data read from the disk, and a controller configured to receive a read command from a host device indicating a target sector on the disk, obtain a latency time ($T_L$) in relation to a movement time ($T_M$) and a search time ($T_S$), and read pre-fetch data from the disk at a current position ($P_C$) during the latency time ($T_L$) and store the pre-fetch data in the memory, where the movement time ($T_M$) is defined as the time required to rotate the disk such that the target sector moves from an initial position ($P_0$) to a target position ($P_1$), and the search time ($T_S$) is defined as the time required to move a magnetic head in the HDD from the current position ($P_C$) to the target position ($P_1$).

DESCRIPTION OF EMBODIMENTS

Reference will now be made to embodiments of the present invention, examples of which are illustrated in the accompanying drawings, wherein like reference numerals refer to the like elements throughout.

Referring to FIGS. 1 through 6, a hard disk drive (HDD) 100 according to an embodiment of the invention includes at least one disk 110 recording data, a spindle motor 120 rotating the disk 110, a head stack assembly (HSA) 130 pivoting around a pivot shaft 130a and moving across the disk 110, a printed circuit board assembly (PCBA) 140, a controller 170 installed on a printed circuit board (PCB), a base 150, and a cover 160 covering the base 150 to seal the HDD against external contaminants.

Figure 1:
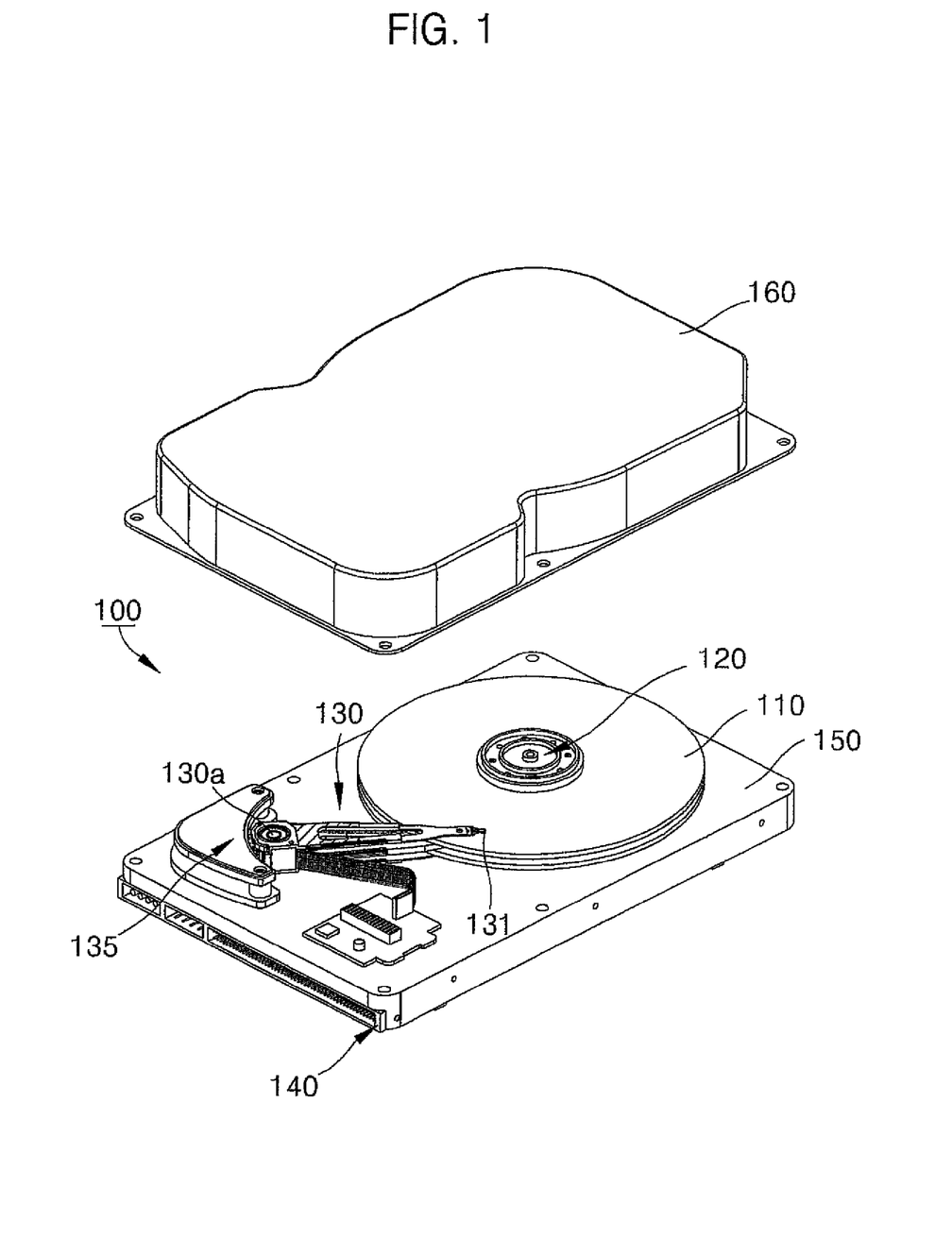
FIG. 1 is an exploded perspective view of a hard disk drive (HDD) according to an embodiment of the present invention.

Disk 110 may be provided as a single disk or as a multiplicity of disks. When multiple disks 110 are provided, each is separated by a predetermined distance and mounted in an assembly on base 150. One or both primary surfaces of disk 110 are coated with a thin film magnetic material adapted to store data. The magnetic material coating the surface of disk 110 may be formed by conventional methods such as electric plating, sputtering, chemical vapor-deposition, and physical vapor-deposition.

Disk 110 comes in a number of standard sizes (e.g., 0.85, 1.0, 1.8, 2.5, 3.5, 5.25, 8, and 14 inches), but embodiments of the invention are not limited to only standard size disks. The material(s) forming disk 110 may include aluminum alloy, glass, glass composition, and magnesium alloy, for example.

Figure 2:
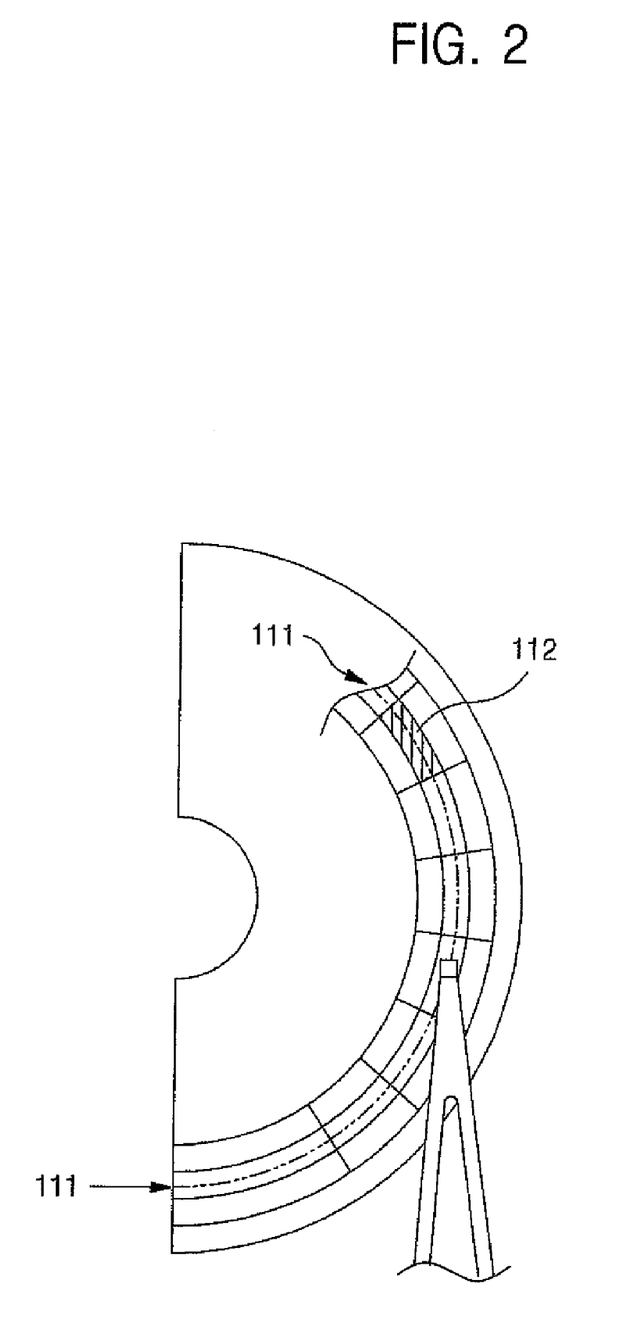
FIG. 2 is a schematic view further illustrating the structure of a disk provided in the HDD drive of FIG. 1.

Disk 110 includes a large number, (e.g., several hundred thousand) of tracks 111 formed in a plurality of concentric circles around the center of disk 110. Where a plurality of disks 110 is used in HDD 100, the term "track" may be understood to indicate "a cylinder" formed from a set of tracks 111 each located at the same radius on respective disks.

Each track 111 includes a plurality of sectors 112 comprising a servo sector and a data sector. The servo sector includes servo information consisting of a gray code that includes information regarding the disposition and identity of tracks 111 on disk 110. This information may be read in a burst manner by magnetic head 131. The data sector includes, in one embodiment of the invention consistent with contemporary designs, 512 bytes of (user defined) data and associated error correction code (ECC).

Disk 110 may be physically identified and characterized by a cylinder head sector (CHS) containing configuration information. That is, while rotating with respect to a fixed index having a defined radial axis extending from the center of disk 110, the multiplicity of sectors 112 designated on disk 110 may be identified by relative position as a first sector, the second sector, . . . and the N-th sector, where N is the number of sectors on any given track.

Spindle motor 120 rotates disk 110 in response to an applied control signal received from controller 170. Standard rotational angular speeds for spindle motor 120 include 3,600 rpm, 5,400 rpm, 7,200 rpm, or 10,000 rpm, but embodiments of the invention are not limited to standard speeds.

HSA 130 pivots around the pivot shaft 130a to move magnetic head 131 from one position to another over the surface of disk 110. HSA 130 includes magnetic head 131 which is adapted to read data from and/or write data to disk 110. HSA 130 also includes a slider (not shown) mounting and lifting magnetic head 131 over the surface of disk 110, a suspension (not shown) elastically supporting the slider toward the surface of disk 110, an actuator arm (not shown) coupled to pivot shaft 130a capable of pivoting and extending such that magnetic head 131 may extend over disk 110, and an actuator 135 rotating the actuator arm.

Magnetic head 131 reproduces data from disk 110 by detecting a magnetic field formed on the surface of disk 110 and/or records data on disk 110 by magnetizing its surface. Magnetic head 131, while moving over the tracks of disk 110, reproduces or records data when a target sector 112a is located directly under magnetic head 131.

The slider physically supports and simultaneously lifts magnetic head 131 above the surface of disk 110. To better provide these functions, the slider preferably has a streamlined shape that exerts a lift force under the influence of rotating disk 110.

The suspension connects the actuator arm and slider and elastically supports the slider toward the surface of disk 110. Thus, the suspension prevents that magnetic head 131 from colliding with the surface of disk 110 as it moves very closely over the surface of disk 110. It also restricts undue separation of magnetic head from the surface of disk 110 which would lead to deterioration in the recording and reproducing performance of HDD 100.

The actuator arm has one end connected to the suspension and the other end coupled to pivot shaft 130a capable of rotating. The actuator arm extends outwardly such that magnetic head 131 may freely move over the entire surface of disk 110.

Actuator 135 rotates the actuator arm around pivot shaft 130a as a center axis. Actuator 135 includes a voice coil and a magnet (both not shown). Actuator 135 allows the actuator arm to pivot in a direction following Fleming's left hand rule under the influence of an electromagnetic force generated by the interaction between a magnetic field generated by the magnet and current flowing through the voice coil. Controller 170 controls the electromagnetic force acting on the mechanisms moving magnetic head 131 over the surface of disk 110.

Although actuator 135, as illustrated, includes a voice coil motor (VCM), other embodiments of the invention may include an actuator 135 formed from a stepper motor rotating the actuator arm by a predetermined angle according to an input signal. However there are advantages to using a VCM to implement actuator 135, such as heat resistant, high reliability, and no need to periodically format.

Controller 170 controls the mechanical and electrical operations within HDD 100 and may be implemented using a conventional digital signal processor (DSP), microprocessor, or microcontroller. Various functional aspects of controller 170 may be implemented in software stored on a recording medium and/or in firmware.

Figure 3:
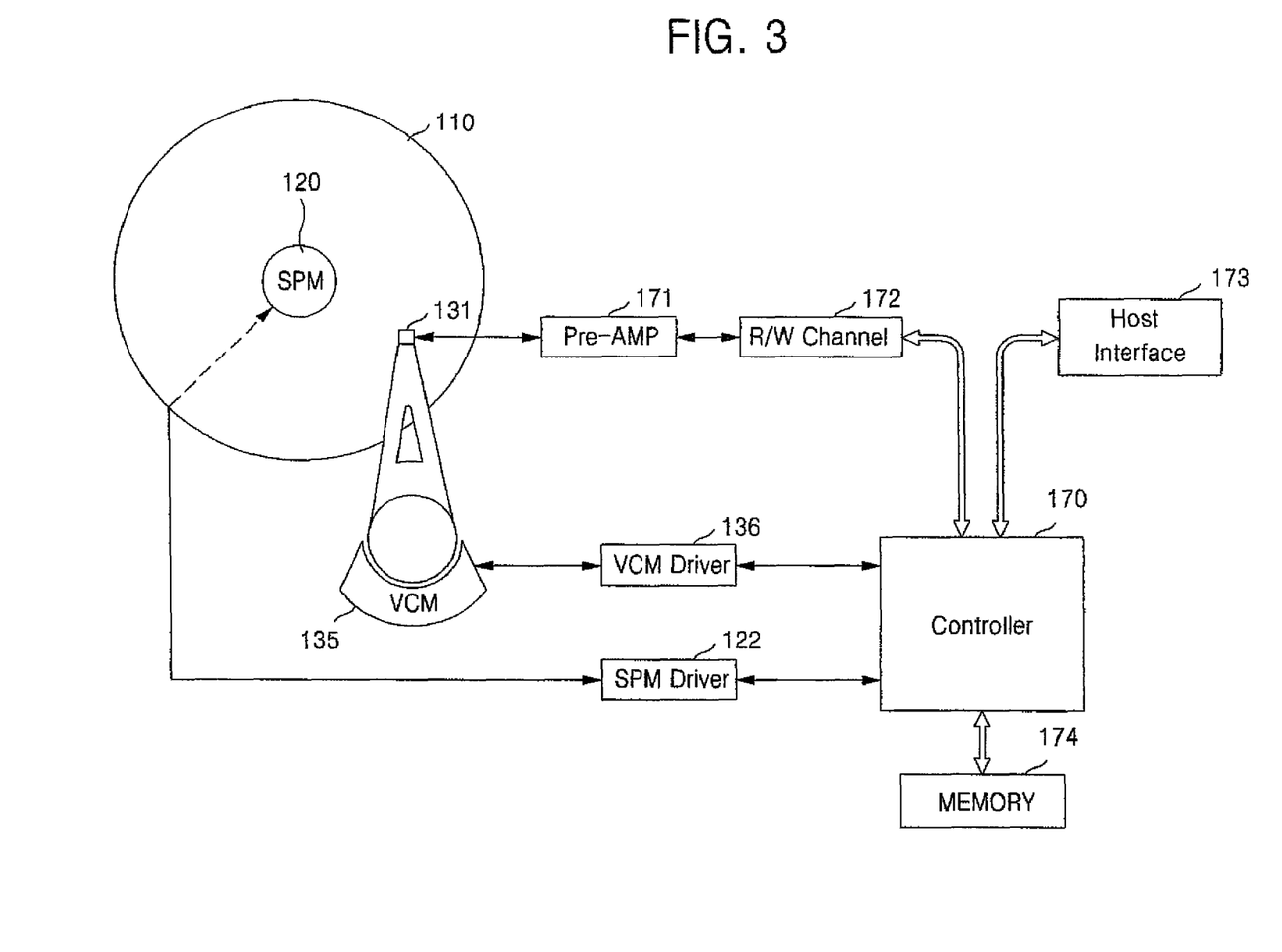
FIG. 3 is a block diagram of various driving circuit within the HDD of FIG. 1.

Controller 170, as shown in FIG. 3, controls (decelerates or accelerates) the rotational angular speed of spindle motor 120 applying a control signal. Controller 170 also controls VCM 135 by applying another control signal.

Controller 170 is configured to calculate a latency time ($T_L$) within HDD 100 on the basis of a movement time ($T_M$) required to rotate disk 110 to a point where magnetic head 131 may read data from a designated target sector and a search time ($T_S$). Several examples of calculation will be described in some additional detail hereafter.

As shown in FIG. 3, HDD 100 according to an embodiment of the invention may further include a pre-amplifier (pre-AMP) 171, a read/write (R/W) channel 172, a host interface 173, a memory 174, a voice coil motor (VCM) driver 136, a spindle motor (SPM) driver 122. Controller 170 is further configured to control these elements.

Pre-amplifier 171 amplifies a read data signal received from magnetic head 131, and/or amplifies a write recording current received from read/write channel 172.

Read/write channel 172 converts the read data signal received from pre-amplifier 171 into a digital data signal suitable for storage in memory 174 and/or transmission to the host device via host interface 173. Read/write channel 172 may also convert digital data signals into a write current suitable for application to magnetic head 131. Host interface 173 facilitates data communication to the host device.

Memory 174 may be implemented as a random access memory (RAM), such as a flash memory. Memory 174 may serve one or more purposes within HDD 100. For example memory 174 may be used to store all or part of the software used in conjunction with controller 170.

Additionally, memory 174 may be used as a data cache holding pre-fetch data retrieved from disk 110. Information theory and the operational nature of digital data based devices suggest that certain data is more likely to be accessed in near-term subsequent read operations than other data. For example, recently accessed data is often more likely to be accessed in the near term than less recently accessed data. Thus, when magnetic head 131 is not otherwise occupied by read/write operations, controller 170 of HDD 100 may initiate pre-fetch data read operations to retrieve selected data from disk 110 and store it in memory 174. When a subsequent read operation is received, memory 174 is first searched before normal HDD operations are begun (or while such operations are beginning). Where the requested data is located in memory 174 (a "read hit" to memory 174), the data may be provide much more quickly than may be typically provided through conventional HDD read operations. In this manner, data access speed may be markedly improved. The ratio of read hits to cached pre-fetch data is improved in proportion to the amount of pre-fetch data stored in memory 174.

In view of these dynamics, embodiments of the invention use any latency time ($T_L$) calculated by controller 170 to increase the amount of cached pre-fetch data stored in memory 174 in order to improve the read hit ratio of subsequent read operations.

Controller 170 provided in HDD 100 according to embodiments of the invention is configured to control read and write operations to disk 110—including VCM 135 operation to move magnetic head 131 and spindle motor 120 operation to rotate disk 110. Controller 170 is further configured to calculating the latency time ($T_L$) as a function of search time ($T_S$) and movement time ($T_M$).

In a read operation, the data read signal provide by magnetic head 131 is amplified by pre-amplifier 171, converted by read/write channel 172, and then output to the host device via host interface 172, all under the control of controller 170. In a write operation, data from the host device is received through host interface 173, applied to read/write channel 172 through controller 170, and converted into a binary data stream suitable for writing onto disk 110. However, when not engaged in such read/write operations, controller 170 may use the HDD resources to pre-fetch data and store it in memory 174 in order to improve the read hit ratio.

The concept of latency time ($T_L$) may be better understood by considering exactly what happens when a read command is received in the HDD 100. Two basic functions must be performed to accomplish a read operation directed to a target sector. First, magnetic head 131 must be properly positioned. To do this, controller 170 applied a control signal through VCM driver 136 to VCM 135. The applied control signal adjusts the amount of current applied to VCM 135, and hence the rotational driving force generated by the interaction between the current flowing through the voice coil and the magnetic field developed by the magnet. The rotational driving force of VCM 135 enables the actuator arm to pivot so that magnetic head 131 moves from a current position ($P_C$) to a desired target position ($P_1$) above disk 110. The time required to re-position magnetic head 131 will be termed search time ($T_S$).

Second, disk 110 must be rotated to bring the target sector indicated by the received read command into proper position under magnetic head 131. This is accomplished by controlling the operation of spindle motor 120 by applying a control signal from controller 170 through SPM driver 122. The applied control signal adjusts the amount of current applied to spindle motor 120. The time required to rotate disk 110 such that a target sector is properly positioned under magnetic head 131 for reading will be termed movement time ($T_M$).

The calculation of latency time ($T_L$) from search time ($T_S$) and movement time ($T_M$) may be made by controller 170 in advance of actually moving magnetic head 131 in response to a received read command. Where a sufficiently long latency time ($T_L$) is identified by this calculation, HDD 100 may conduct pre-fetch read operations at its current magnetic head position to load memory 174 and thereby improve the read hit ratio to pre-fetched data.

One method of controlling the operation of HDD 100 to improve the read hit ratio to pre-fetch data stored in memory 174 will now be described. Consider an example illustrated in FIG. 4a in which magnetic head 131 is located at a current position ($P_C$) on tack 111b, and must be moved along axis "L" to a target position ($P_1$) at which a target sector 112a along track 111a can be read. As further illustrated in FIG. 4b, if magnetic head 131 is immediately moved from its current position ($P_C$) upon receipt of the read command to the target position ($P_1$), disk 110 will have rotated from its initial position ($P_0$) to an intermediate position ($P_I$) during search time ($T_S$). However, magnetic head 131 will then wait during the latency period ($T_L$) while disk 110 is rotated from the intermediate position ($P_I$) to the target position ($P_1$). In other words, because the movement time ($T_M$) is longer than the search time ($T_S$), magnetic head 131 will conventionally lie dormant and unused during latency period ($T_L$). This result represents a waste of HDD resources which is corrected in embodiments of the present invention.

Figure 6:
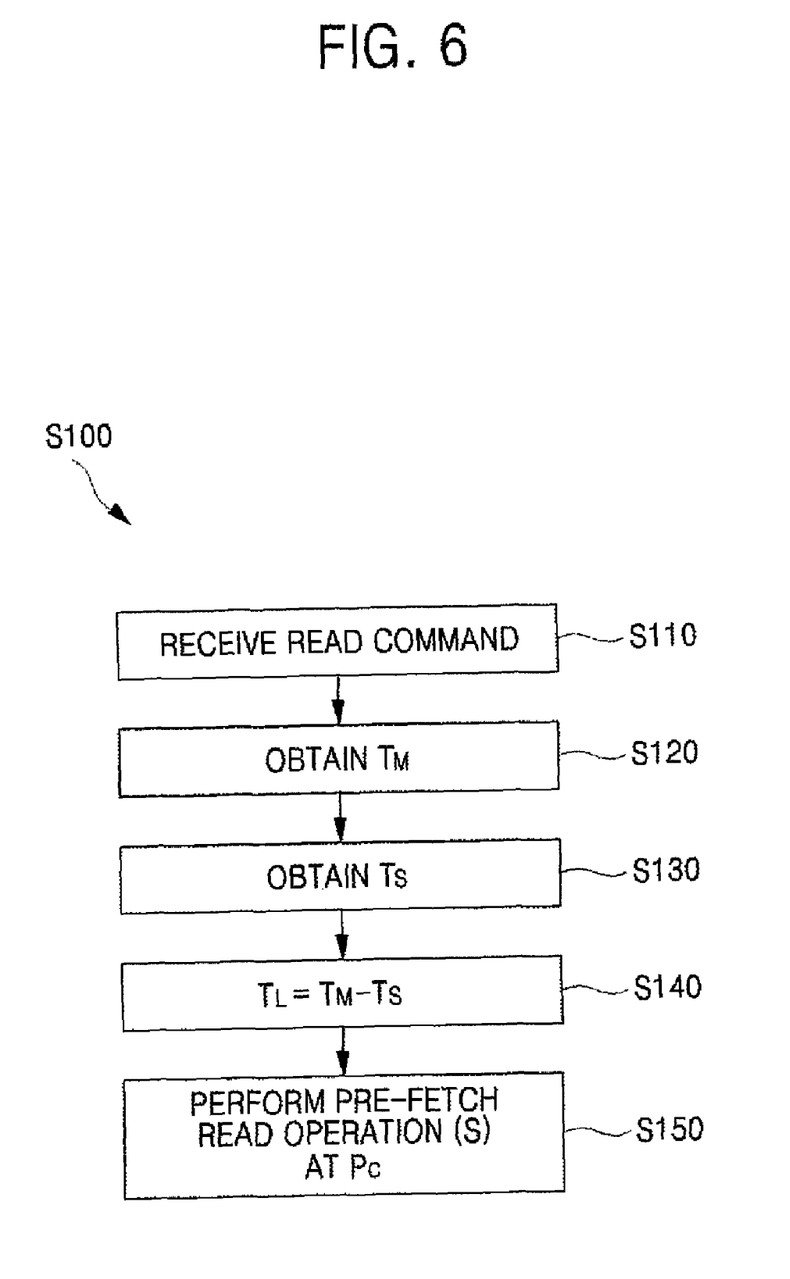
FIG. 6 is a flow chart summarizing a control method for improving the read hit ratio to stored pre-fetch data in the HDD of FIG. 1.

One control method (S100) for improving the read hit ratio to pre-fetch data stored in memory associated with HDD 100 is illustrated in FIG. 6. This control method makes good use of the calculated latency time ($T_L$). In the illustrated control method, upon receipt of a read command and before moving magnetic head 131 (S110), controller 170 obtains a movement time ($T_M$) (S120) and a search time ($T_S$) (S130). Then a latency period ($T_L$) is calculated (S140) from these two values. Thereafter, if the calculated latency period ($T_L$) is sufficiently large, controller 170 may instruct magnetic head 131 to perform pre-fetch read operations at its current position ($P_C$) (S150).

In this control method according to an embodiment of the invention, the movement time ($T_M$) and search time ($T_S$) may be various obtained. For example, obtaining the movement time ($T_M$) implicated in a read operation may be made in relation to a knowledge regarding the sector layout along tracks 111 on disk 110. This information may be readily obtained by recourse to physical information data associated with disk 110, such as the information contained in a cylinder head sector (CHS). Various other sector tracking techniques may be used.

In one approach, each sector is identified by an address indicating a location along track 111. According to this address, each sector may be viewed as having a numbered location (1st through Nth along track 111). In this context, movement time ($T_M$) may be calculated according to the following equation:

$$T_M = \frac{N_H - N_{TS}}{N_S} T_D, \qquad \text{[Equation 1]}$$

where $N_{TS}$ is physical information data associated with the target sector, $N_H$ is physical information data associated with the current sector, $N_S$ is the total number of the sectors along a target track, and TD is the time required to complete one full rotation of disk 110.

For example, if a target sector is identified by a received read command as being located in 25th position along a target track 111a. Whereas, the sector currently being read by magnetic head 133 is located in 10th position along current track 111b. Further it is known that there are one hundred thousand sectors along target track 111a, and that one complete revolution of disk 110 takes 1 ms. In this example movement time ($T_M$) may be obtained as $$T_M = \frac{25-10}{100000} 1 \text{ ms} = 1.5 \times 10^{-4} \text{ ms}$$

In this context, the physical information data associated with target sector 112a may be derived from a logical address communicated to HDD 100 from the host device as part of the read command. The physical information data associated with the current sector may be obtained from a register value updated by controller 170 during each read/write operation.

Figure 4A:
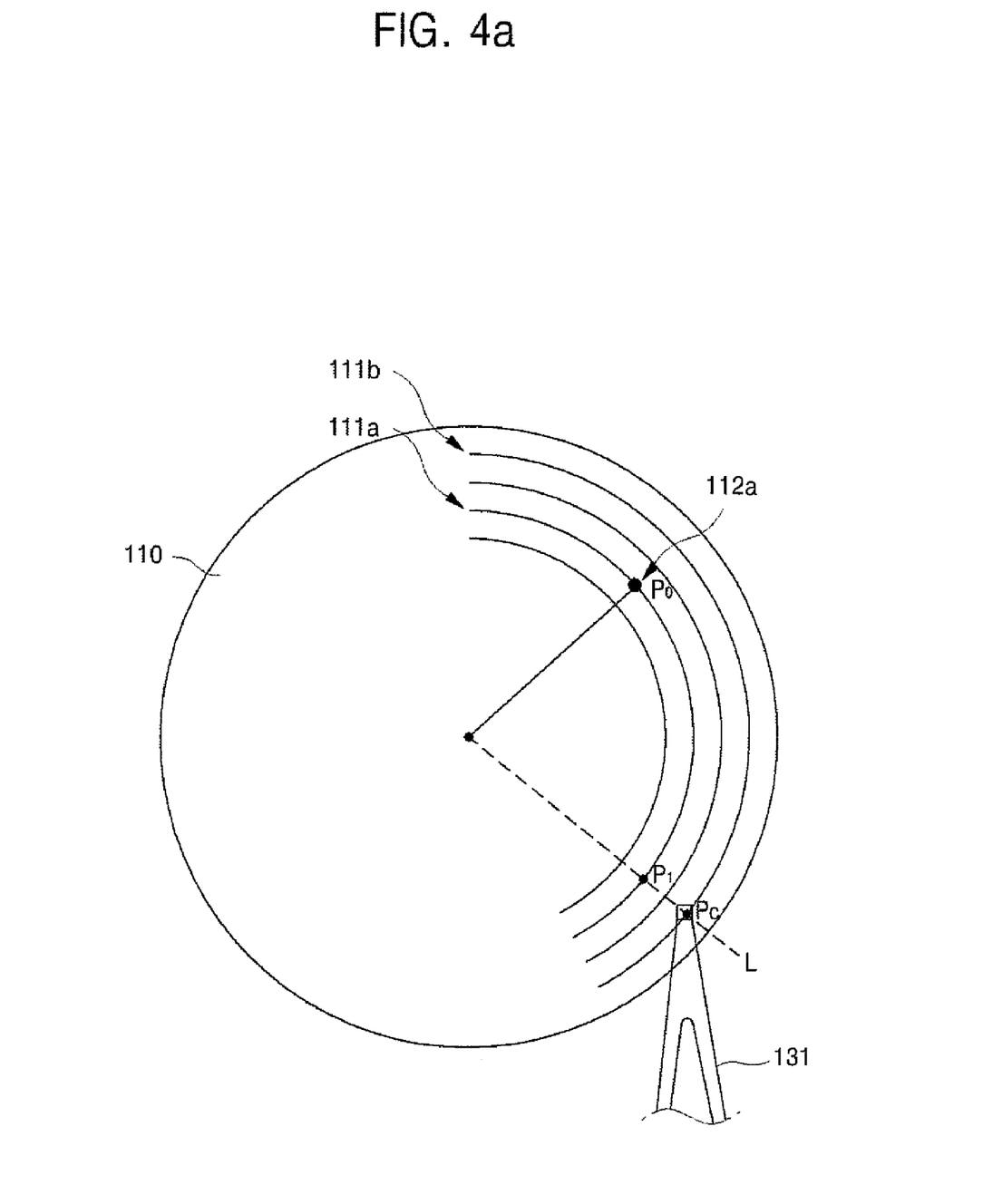
FIGS. 4A and 4B are schematic views illustrating the relative movement of a magnetic head and rotation of a disk within the HDD of FIG. 1.
Figure 4B:
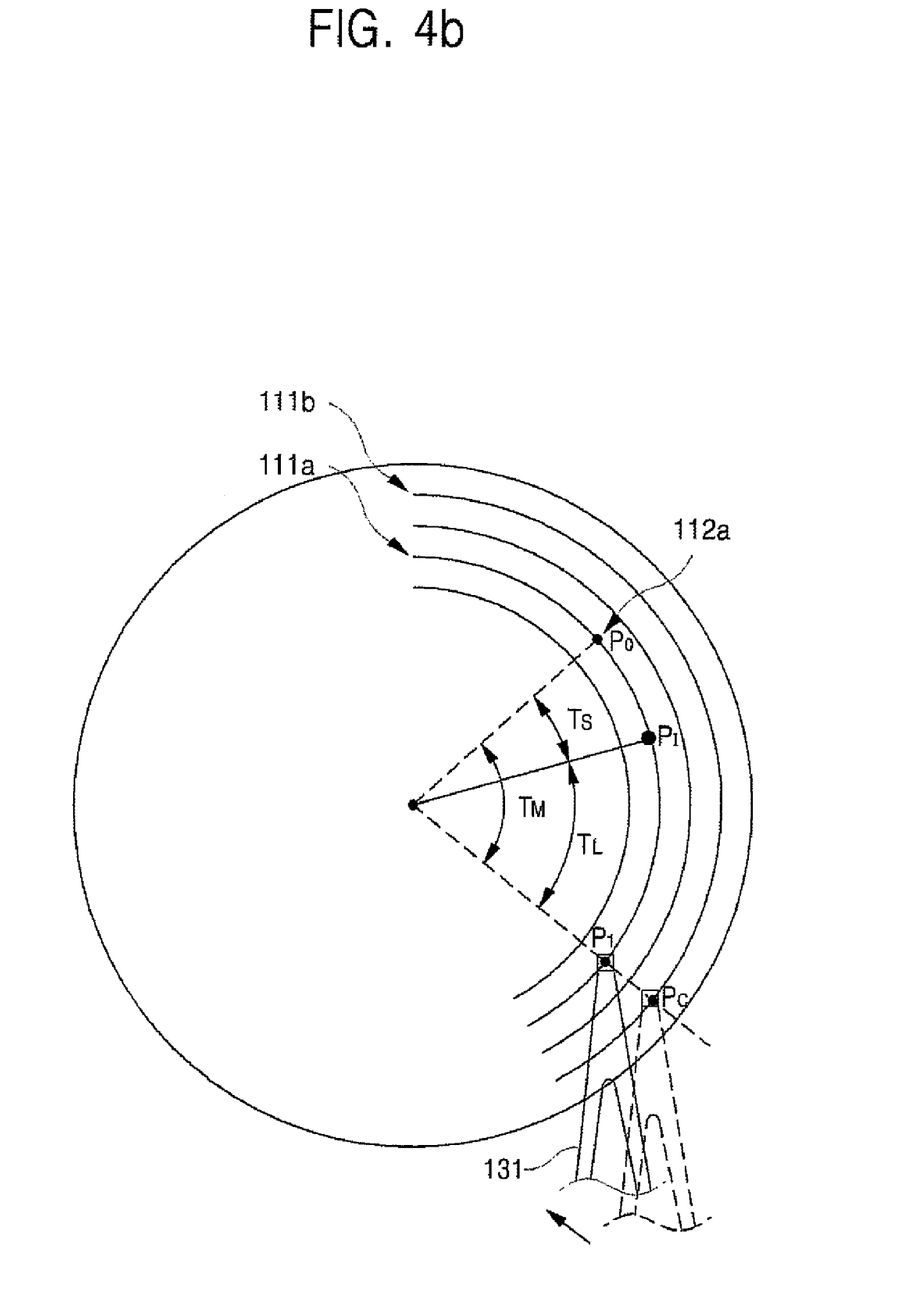

The search time ($T_S$) may be obtained by understanding the amount of time required for magnetic head 131 to move from a current track 111b to a target track 111a. Since the movement of magnetic head 131 is linear along axis "L" in the working example, and since the track boundaries on disk 110 are fixed, search time ($T_S$) may be obtained by reference to search time table having entries populated in accordance with experimentally derived empirical data and/or statistically calculated data.

Where movement time ($T_M$) is greater than or equal to search time ($T_S$), latency time ($T_L$) may be obtained by merely subtracting ($T_S$) from ($T_M$).

Where the calculated latency time ($T_L$) is sufficiently long, as determined for example by comparison to a reference time (TO), HDD 100 may perform one or more pre-fetch data read operations at the current position ($P_C$). Where the calculated latency period is insufficiently long, magnetic head 131 is immediately moved to the target position ($P_1$).

Figure 5A:
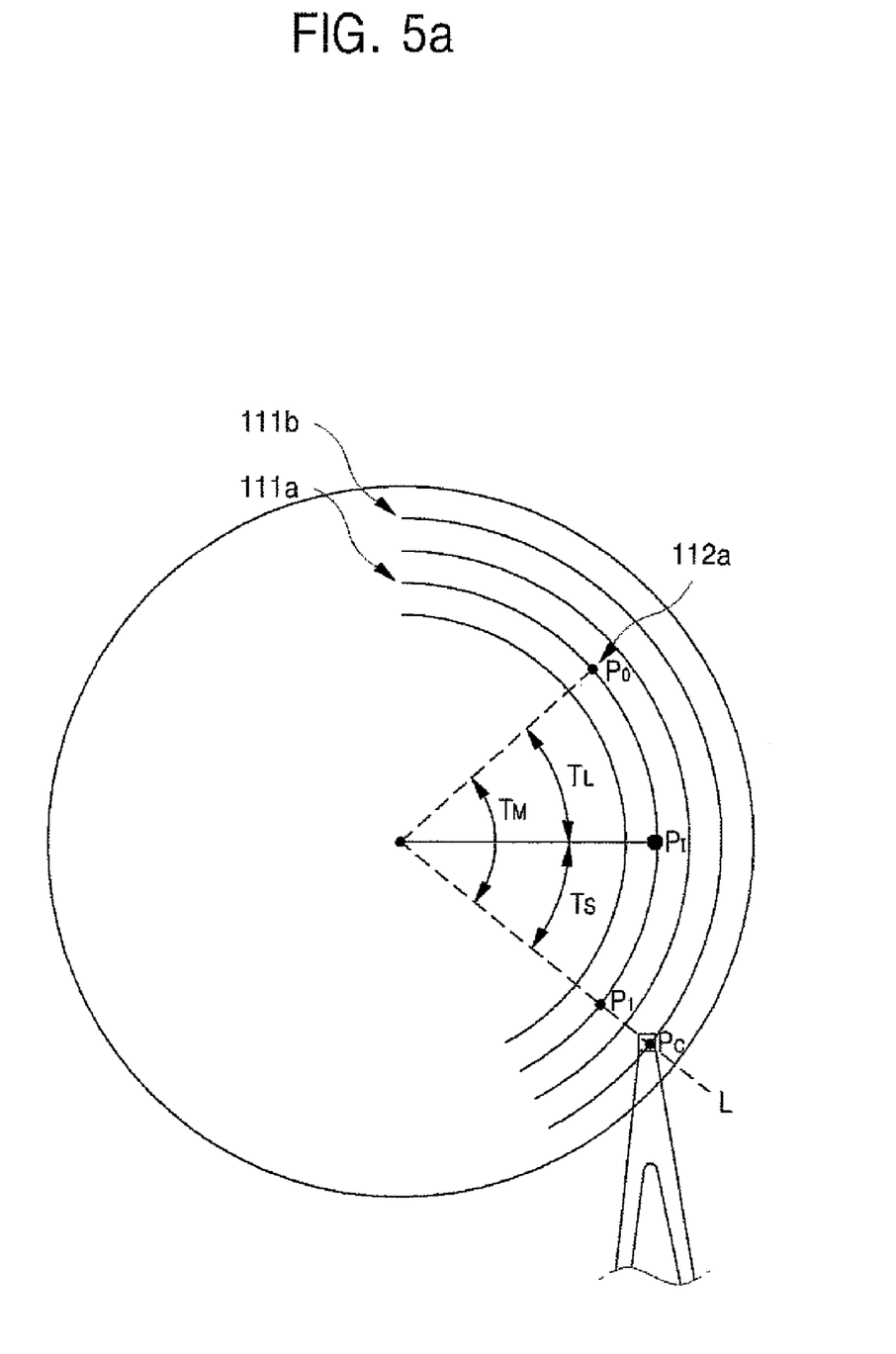
FIGS. 5A and 5B are schematic views again illustrating the relative movement of a magnetic head and rotation of a disk within the HDD of FIG. 1.
Figure 5B:
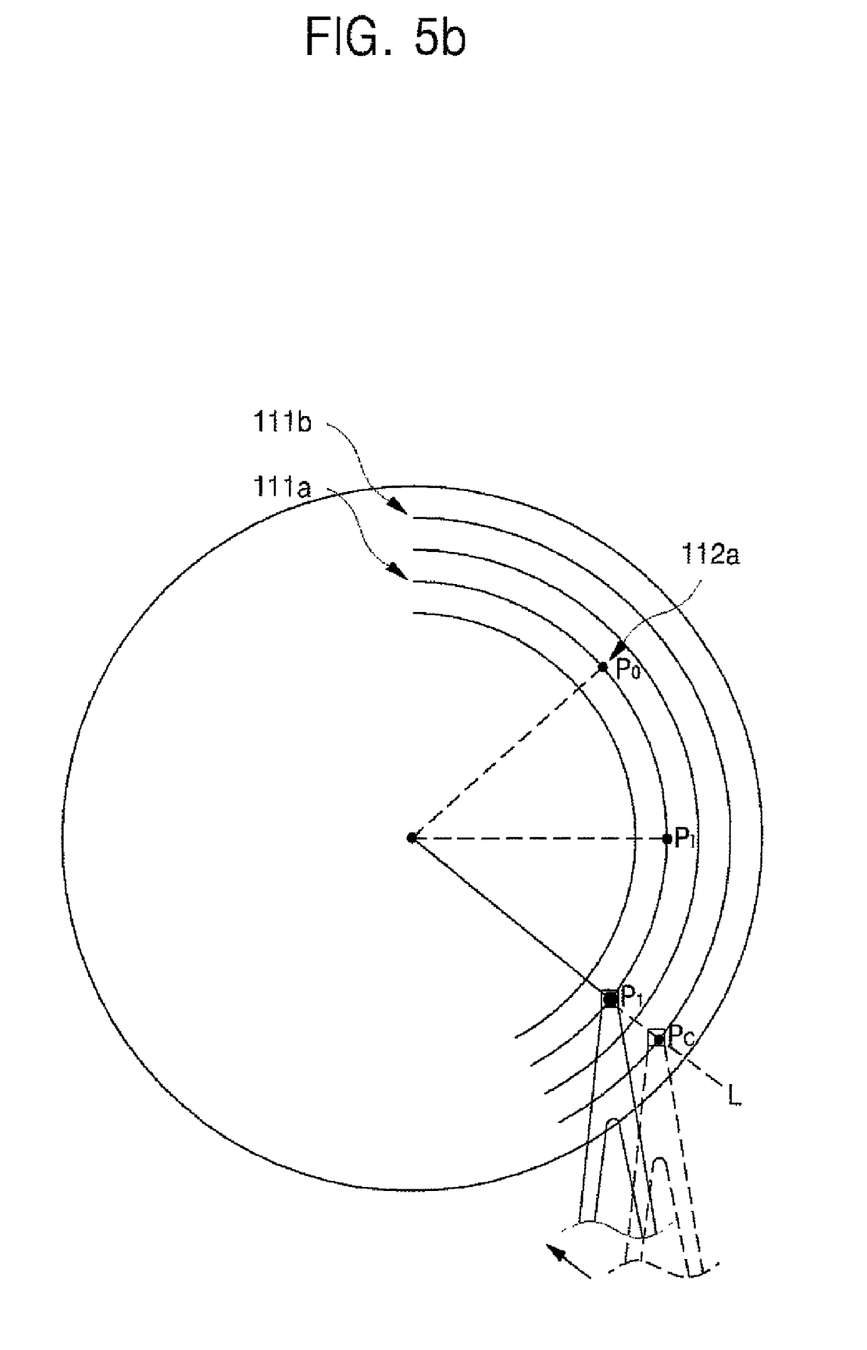

This control method is further illustrated in FIGS. 5A and 5B. Here, target sector 112a arrives at intermediate position ($P_1$) from initial position ($P_0$) during latency time ($T_L$), as calculated by controller 170. During latency time ($T_L$) magnetic head 131 is busy performing one or more pre-fetch data read operations at its current position ($P_C$) and storing the pre-fetch data in memory 174. Upon the expiration of during latency time ($T_L$) and during the search time ($T_S$), as disk 110 rotates target sector 112a from the intermediate position ($P_I$) to the target position ($P_1$), magnetic head 131 moves from its current position ($P_C$) to the target position ($P_1$).

Figure 7:
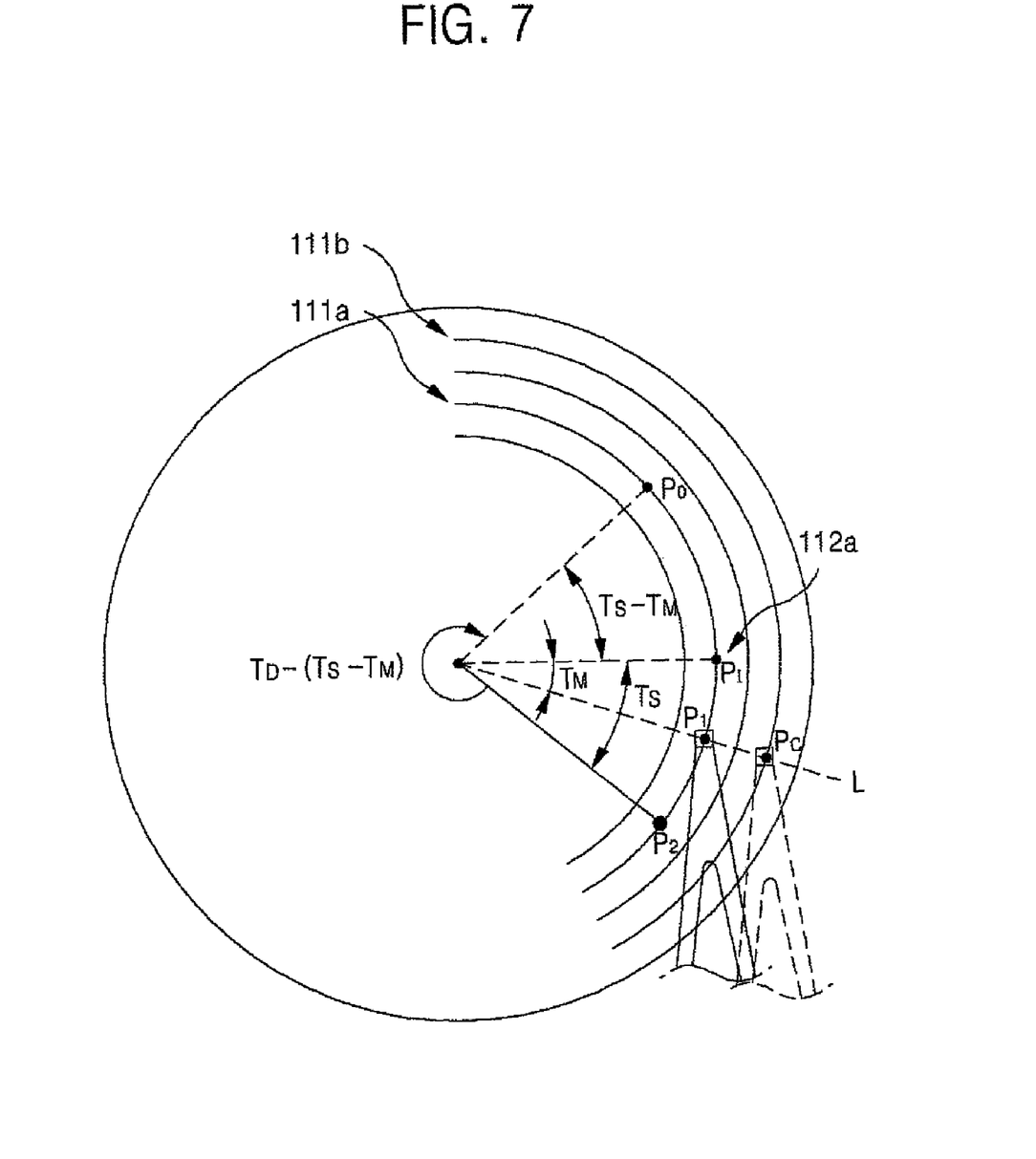
FIG. 7 is a schematic view illustrating relative positions of a magnetic head and the target sector within an HDD according to another embodiment of the present invention.
Figure 8:
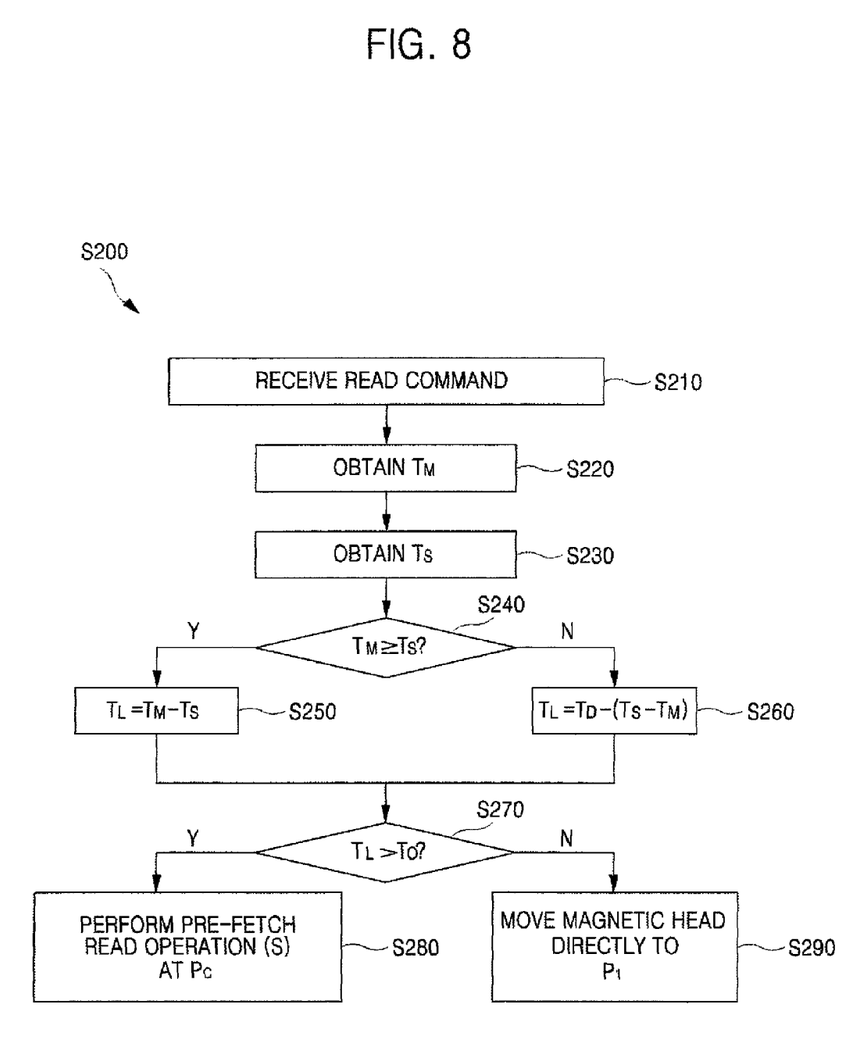
FIG. 8 is a flow chart summarizing another control method for improving a read hit ratio to stored pre-fetch data in the HDD of FIG. 1.

A control method for improving the read hit ratio to pre-fetch data stored in a memory associated with a HDD according to another embodiment of the invention will be described with reference to FIG. 7. FIG. 7 is a schematic view illustrating the relative positioning magnetic head 131 and target sector 112a for conditions wherein the movement time ($T_M$) is less than the search time ($T_S$). FIG. 8 is a related flow chart summarizing a control method taking this condition and the former condition ($T_M \geq T_S$) into account.

Referring to FIGS. 7 and 8, a control method providing an improved read hit ratio within HDD 100 according to another embodiment of the present invention (S200) includes receiving a read command indicating target sector 112a of disk 110 (S210). A movement time ($T_M$) is obtained (S220), and a search time ($T_S$) is obtained (S230). A comparison of movement time ($T_M$) to search time ($T_S$) is made (S240). Respective, calculation approaches to the determination of latency time ($T_L$) are dictated by the comparison result (S250 and S260). Where latency time ($T_L$) is greater than a defined reference time (TO), HDD 100 performs one or more pre-fetch read operations at the current position ($P_C$) (S280).

Where latency time ($T_L$) is not greater than the defined reference time (TO), magnetic head 131 is moved directly to the target position ($P_1$) (S290).

Where the movement time ($T_M$) is determined to be less than the search time ($T_S$) (S240), the calculation of latency time $T_L$ in relation to movement time ($T_M$) and search time ($T_S$) may be made according to the following equation:

$$T_L = TD - (T_S - T_M),$$

wherein TD is the time required to complete one rotation of disk 110.

As shown in FIG. 7, when the movement time ($T_M$) needed for target sector 112a to move to the target position ($P_1$) from intermediate position ($P_I$) is less than the search time ($T_S$), the target sector 112a may be located at passed point ($P_2$). Thus, as the target sector 112a rotates back around to the target position ($P_1$), magnetic head 131 must wait. Here again, this proves an inefficient use of HDD resources. Consequently, when the movement time ($T_M$) is less than the search time ($T_S$), the latency time $T_L$ must be calculated in a different manner, allowing the execution of pre-fetch read operation(s) in certain circumstances.

As described above, according to the methods for improving a read hit ratio of a HDD according to the above described embodiments of the invention, since magnetic head 131 can perform one or more pre-fetch operations during the calculated latency time ($T_L$), relatively more pre-fetch data may be stored in memory 174. This additional provision of pre-fetch data to memory 174 increases the likelihood of a read hit during a subsequent read operation.

Although several embodiments of the invention have been illustrated and described, the invention is not limited to only these embodiments. Instead, it will be appreciated by those skilled in the art that various changes may be made to the illustrated embodiments without departing from the scope of the invention as defined by the following claims and their equivalents.

What is claimed is:

1. A method for increasing read hits to pre-fetch data stored in a memory associated with a hard disk drive (HDD), the method comprising:

receiving a read command indicating a target sector on a disk in the HDD;

obtaining a latency time ($T_L$) in relation to a movement time ($T_M$) and a search time ($T_S$);

wherein the movement time ($T_M$) is defined as the time required to rotate the disk, such that the target sector moves from an initial position ($P_0$) to a target position ($P_1$), and the search time ($T_S$) is defined as the time required to move a magnetic head in the HDD from a current position ($P_C$) to the target position ($P_1$); and during the latency time ($T_L$), reading pre-fetch data from the disk at the current position ($P_C$) and storing the pre-fetch data in the memory before executing the received read command, wherein when $T_M$ is less than $T_S$, obtaining the latency time ($T_L$) comprises subtracting the movement time ($T_M$) from the search time ($T_S$) to obtain a subtractive result, and then subtracting the subtractive result from a rotational period time (TD), the rotational period time (TD) being defined as the amount of time required for the disk to complete one full revolution.

2. The method of claim 1, wherein when $T_M$ is greater than or equal to $T_S$, obtaining of the latency time ($T_L$) comprises obtaining the movement time ($T_M$) and the search time ($T_S$), and subtracting the search time ($T_S$) from the movement time ($T_M$).

3. The method of claim 2, wherein, the movement time ($T_M$) is obtained from an equation, $$T_M = \frac{N_H - N_{TS}}{N_S} T_D,$$

wherein $N_{TS}$ is physical information data regarding the target sector, $N_H$ is physical information data regarding a sector associated with the current position ($P_C$) of the magnetic head, $N_S$ is the number of the sectors included in a target track associated with the target sector, and TD is a rotational period time required to complete one revolution of the disk.

4. The method of claim 2, wherein the search time ($T_S$) is obtained using a search time table in relation to a number of tracks the magnetic head must move from the current position ($P_C$) to the target position ($P_1$).

5. A method of increasing read hits to pre-fetch data stored in a memory associated with a hard disk drive (HDD), the method comprising:
  receiving a read command indicating a target sector on a disk in the HDD;
  obtaining latency time ($T_L$) in relation to a movement time ($T_M$) and a search time ($T_S$);
  wherein the movement time ($T_M$) is defined as the time required to rotate the disk, such that the tar et sector moves from an initial position ($P_0$) to a target position ($P_1$), and the search time ($T_S$) is defined as the time required to move a magnetic head in the HDD from a current position ($P_C$) to the target position ($P_1$); and
  during the latency time ($T_L$), reading pre-fetch data from the disk at the current position ($P_C$) and storing the pre-fetch data in the memory before executing the received read command,
  wherein reading pre-fetch data during the latency period (TL) comprises:
    comparing the latency time (TL) with a reference time (TR); and
    reading pre-fetch data from the disk at the current position (P0) for a period of time equal to latency time (TL) minus the reference time (TR), if (TL) is greater than (TR), else immediately moving the magnetic head to the target position (P1).

6. A non-transitory computer readable recording medium for recording a computer program performing a method for increasing read hits to pre-fetch data stored in a memory associated with a hard disk drive (HDD), the method comprising:
  receiving a read command indicating a target sector on a disk in the HDD;
  obtaining a latency time ($T_L$) in relation to a movement time ($T_M$) and a search time ($T_S$);
  wherein the movement time ($T_M$) is defined as the time required to rotate the disk, such that the target sector moves from an initial position ($P_0$) to a target position ($P_1$), and the search time ($T_S$) is defined as the time required to move a magnetic head in the HDD from a current position ($P_C$) to the target position ($P_1$); and
  during the latency time ($T_L$), reading pre-fetch data from the disk at the current position ($P_C$) and storing the pre-fetch data in the memory before executing the received read command,
  wherein when $T_M$ is less than $T_S$, obtaining the latency time ($T_L$) comprises subtracting the movement time ($T_M$) from the search time ($T_S$) to obtain a subtractive result, and then subtracting the subtractive result from a rotational period time (TD), the rotational period time (TD) being defined as the amount of time required for the disk to complete one full revolution.

7. The method of claim 6, wherein when $T_M$ is greater than or equal to $T_S$, obtaining of the latency time ($T_L$) comprises obtaining the movement time ($T_M$) and the search time ($T_S$), and subtracting the search time ($T_S$) from the movement time ($T_M$).

8. The method of claim 7, wherein, the movement time ($T_M$) is obtained from an equation, $$T_M = \frac{N_H - N_{TS}}{N_S} T_D,$$

wherein $N_{TS}$ is physical information data regarding the target sector, $N_H$ is physical information data regarding a sector associated with the current position ($P_C$) of the magnetic head, $N_S$ is the number of the sectors included in a target track associated with the target sector, and TD is a rotational period time required to complete one revolution of the disk.

9. The method of claim 7, wherein the search time ($T_S$) is obtained using a search time table in relation to a number of tracks the magnetic head must move from the current position ($P_C$) to the target position ($P_1$).

10. A method of increasing read hits to pre-fetch data stored in a memory associated with a hard disk drive (HDD), the method comprising:
  receiving a read command indicating a target sector on a disk in the HDD;
  obtaining a latency time ($T_L$) in relation to a movement time ($T_M$) and a search time ($T_S$);
  wherein the movement time ($T_M$) is defined as the time required to rotate the disk such that the tar et sector moves from an initial position ($P_0$) to a target position ($P_1$), and the search time ($T_S$) is defined as the time required to move a magnetic head in the HDD from a current position ($P_C$) to the target position ($P_1$); and
  during the latency time ($T_L$), reading pre-fetch re-fetch data from the disk at the current position ($P_C$) and storing the pre-fetch data in the memory before executing the received read command,
  wherein reading pre-fetch data during the latency period ($T_L$) comprises:
    comparing the latency time ($T_L$) with a reference time (TR); and
    reading pre-fetch data from the disk at the current position ($P_C$) for a period of time equal to latency time ($T_L$) minus the reference time (TR), if ($T_L$) is greater than (TR), else immediately moving the magnetic head to the target position ($P_1$).

11. A hard disk drive (HDD) comprising:
  a disk;
  a magnetic head reading data from the disk;
  a memory configured to store data read from the disk; and
  a controller configured to receive a read command from a host device indicating a target sector on the disk, obtain a latency time ($T_L$) in relation to a movement time ($T_M$) and a search time ($T_S$), and read pre-fetch data from the disk at a current position ($P_C$) during the latency time ($T_L$) and store the pre-fetch data in the memory;

wherein the movement time ($T_M$) is defined as the time required to rotate the disk such that the target sector moves from an initial position ($P_0$) to a target position ($P_1$), and the search time ($T_S$) is defined as the time required to move a magnetic head in the HDD from the current position ($P_C$) to the target position ($P_1$), and the controller is further configured to obtain the latency time ($T_L$) subtracting the movement time ($T_M$) from the search time ($T_S$) to obtain a subtractive result, and then subtracting the subtractive result from a rotational period time (TD), the rotational period time (TD) being defined as the amount of time required for the disk to complete one full revolution.

12. The HDD of claim 11, wherein the controller is further configured to obtain the movement time ($T_M$) and the search time ($T_S$) and obtain the latency time ($T_L$) by subtracting the search time ($T_S$) from the movement time ($T_M$), where $T_M$ is greater than or equal to $T_S$.

13. The HDD of claim 12, wherein the search time ($T_S$) is obtained using a search time table in relation to a number of tracks the magnetic head must move from the current position ($P_C$) to the target position ($P_1$).

14. The HDD of claim 11, wherein the controller is further configured to obtain the movement time ($T_M$) from an equation, $$T_M = \frac{N_H - N_{TS}}{N_S} T_D,$$

wherein $N_{TS}$ is physical information data regarding the target sector, $N_H$ is physical information data regarding a sector associated with the current position ($P_C$) of the magnetic head, $N_S$ is the number of the sectors included in a target track associated with the target sector, and TD is a rotational period time required to complete one revolution of the disk.

* * * * *